United States Patent [19]

O'Donnell

[11] Patent Number: 4,792,305

[45] Date of Patent: Dec. 20, 1988

[54] COLLIMATED KNITTING PATTERN INSTRUCTION PANEL

[76] Inventor: Elizabeth D. O'Donnell, 8954 Acorn La., Santa Rosa, Calif. 95405

[21] Appl. No.: 894,796

[22] Filed: Aug. 8, 1986

[51] Int. Cl.$^4$ ............................................. G09B 19/20
[52] U.S. Cl. ........................................ 434/95; 66/1 A;
112/266.1; 112/439; 283/1.2
[58] Field of Search ............................. 434/95–97;
283/1 A, 46; 66/1 A; 112/266.1, 266.2, 439

[56] References Cited

U.S. PATENT DOCUMENTS

| | | | |
|---|---|---|---|
| 328,283 | 10/1885 | Brinkerhoff | 2/244 |
| 1,340,460 | 5/1920 | Piccioni | 112/266.1 |
| 3,998,246 | 12/1976 | Strousser | 139/1 R |
| 4,391,591 | 7/1983 | Hamburger | 434/95 |
| 4,520,749 | 6/1985 | Jefferson | 116/325 |
| 4,578,036 | 3/1986 | Leighton | 424/95 |

FOREIGN PATENT DOCUMENTS 2285668  5/1976  France ................................ 283/1 A

OTHER PUBLICATIONS

McCall's Brochure, pp. 1–5, General Instructions, A Sweater For Snuggling.
Knitting Counter, an excerpt from the *New Knitting Dictionary* by Rhoda Ochser Goldberg (1984).

*Primary Examiner*—John E. Murtagh
*Assistant Examiner*—Andrew J. Rudy
*Attorney, Agent, or Firm*—Malcolm B. Wittenberg

[57] ABSTRACT

A collimated knitting pattern instruction panel for instructing a user in the creation of knitwear having patterns thereon which are formed into columns. The knitwear consists of a plurality of rows of yarn each of which having at least two groups of stitching configurations, with each of the groups of stitching configurations defining a portion of a particular one of the patterns. In addition, a plurality of a particular one of the groups of stitching configurations form one of the columns on the knitwear. The collimated knitting pattern instruction panel comprises at least two elongated panel members, with each of the panel members having two horizontal edges and two side edges. At least one of the side edges of a first one of the panel members is in juxtaposition with one of the side edges of a second one of the panel members. Each of the panel members has a plurality of rows of alphanumeric characters with each of the rows being knitting pattern instructions for a particular one of the groups of stitching configurations, whereby the knitting pattern instructions for one of the columns of knitwear patterns are collimated into one of the panel members.

22 Claims, 2 Drawing Sheets

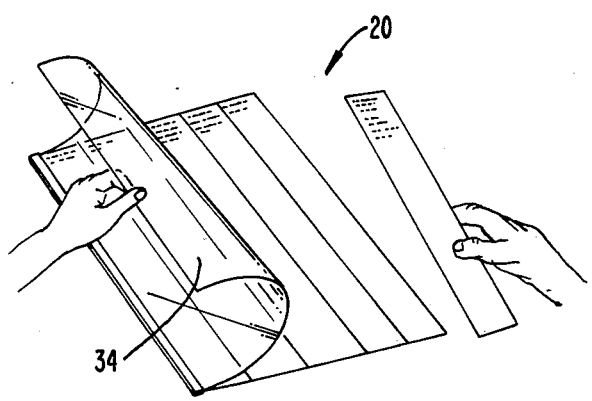
FIG._4.
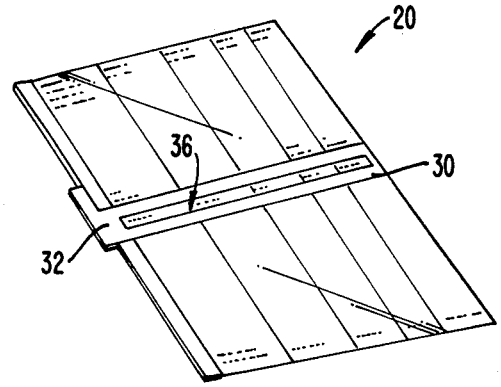
FIG._5.
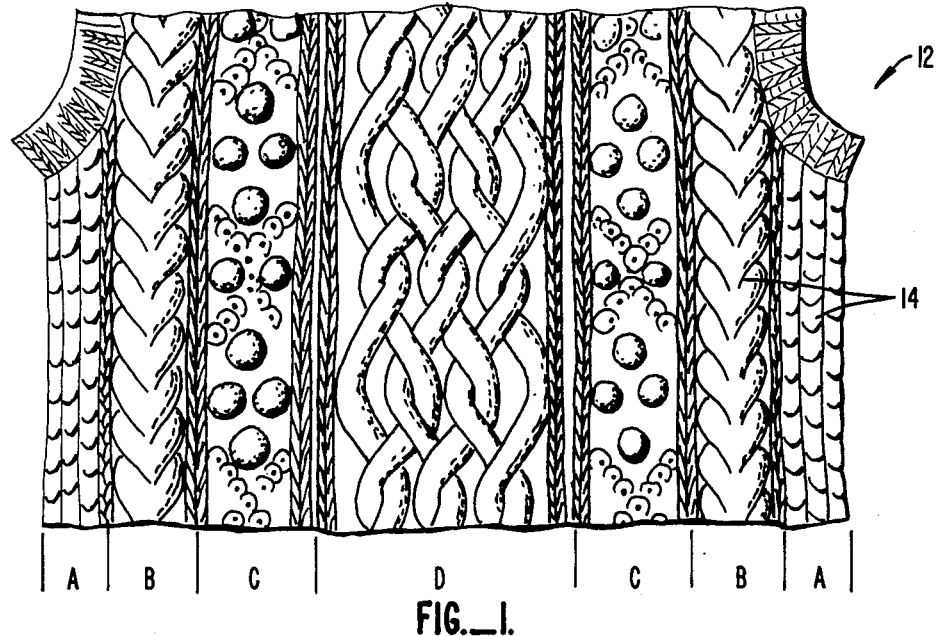
FIG._1.
FIG._3A.

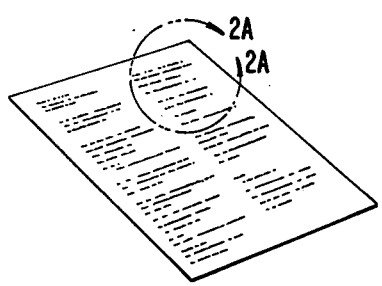

FIG.—2. PRIOR ART

PATTERN STITCH FOR FRONT

⋮

ROW 8: * p1, K1, p3tog, K1, p1, K2,
p10*, K4, p5, K2, p1, K2, p5, K4,
p10, K2, p1, K1, p3tog, K1, p1
ROW 9: Repeat bet *'s of Row1, p4, sl1,
K1, psso, K1, K2tog, p2, K1, p2, sl1,
K1, psso, K1, K2tog, p4, repeat bet
**'s of Row1.

⋮

ROW 16: Repeat bet *'s of Row 8, K6,
y0, p3 tog, y0, K6, repeat bet
**'s of Row 8.
Repeat these 16 rows for pattern stitch.

FIG.—2A. PRIOR ART

| | 26A | 26B | | | |
|---|---|---|---|---|---|
| 1 | * K1(y0,K1) 4 TIMES | *p2, K6 ⋯ | ⋯ | | |
| 2 | p1 (K1,P1) 4 TIMES | K2 P10 ⋯ | ⋯ | | |
| 3 | ⋯ | | | | |
| 4 | p1K1p3tog K1p1 | K2p10 | K7 P5 K7 | P10 K2 | P1K1P3 tog K1 p1 |
| 5 | ⋯ | | | | |
| 6 | ⋯ | | | | |
| 7 | ⋯ | | | | |
| 8 | p1K1 p3togK1p1 | K2P10 | K4P5K2P1K2P5K4 | P10K2 | P1K1P3 tog K1P1 |
| 9 | *K1 (y0,K1) 4 TIMES | p2K6 ⋯ | ⋯ | | |
| 10 | p1 (K1,P1) 4 TIMES | K2P10 ⋯ | ⋯ | | |
| 11 | | | | | |
| ⋮ | ⋯ | | | | |
| 16 | p1 K1p3 tog K1P1 | K2 P10 | K6 y0 P3 tog y0K6 | P10K2 | P1K1P3togL1p1 |
| 17 | *K1(y0,K1) 4 TIMES | *P2 K6 ⋯ | ⋯ | | |
| 18 | P1(K1,P1) 4 TIMES | K2P10 ⋯ | ⋯ | | |
| | 24A | 24B | 24C | 24D | 24E |

FIG.—3.

COLLIMATED KNITTING PATTERN INSTRUCTION PANEL

DESCRIPTION

1. Technical Field

This invention relates to a collimated knitting pattern instruction panel for instructing a user in the creation of knitwear having patterns thereon.

2. Background Art

Knitting is one of the most enduring and endearing skill crafts in our society. Knitwear having patterns thereon is especially favored. Such a knitwear, for example, a sweater, may have as many as five to seven patterns on its front portion. As best shown in FIG. 1, an exemplary sweater has a plurality of patterns which are configured into a collimated fashion, that is, each of the columns of the sweater contains a particular configuration or configurations. Such configurations may be repeated in a different column of the sweater. The knitting instruction for such a well-patterned sweater is not only difficult to decipher but also confusing to the user. For example, as best shown in FIGS. 2 and 2A, knitting instruction for a front portion of a sweater in the prior art, not shown, includes instructions such as those illustrated in FIG. 2A.

In general, a sweater is created by knitting yarn in a horizontal fashion so as to form a linear, horizontal collection of stitches which is referred to as a row. In a patterned sweater, there are several types of stitching such that a user needs to change the stitch type after a certain interval. Moreover, the types of the stitches required for an entire row are given in a semi-coded fashion. For example, the instructions for Row 8 of FIG. 2A start with one purl (p) stitch, followed by one knit (k) stitch, followed by three purl stitches which are stitched together (tog). In this fashion, a row of the sweater is constructed. Asterisks in the instructions are used to delineate a particular row sub-unit. For example, the instructions between the single asterisks in Row 8, (p1, k1, p3 tog, k1, p1, k2, p10), constitute one row sub-unit. Similarly, the instructions between the double asterisks, (p10, k2, p1, k1, p3 tog, k1, p1), constitute another row sub-unit. Instructions in the prior art also include directives for repeating portions of a prior row, e.g., the "Repeat bet [between]*'s of row 8" phase of Row 16. Moreover, instructions include directives to repeat an entire previous row or a block of previous rows, e.g., the last instruction in FIG. 2A. In this fashion, a sweater is constructed.

Such prior art instructions also fail to alleviate difficulties relating to repeats. A "repeat" is a term of art used to indicate the repetition of a previously-given instruction. Due to constraints such as paper size, instructions are generally not given for the entire length of the sweater. Rather, where repetitive patterns are involved, instructions are given only as to a portion or block of the pattern, e.g., the last instruction in FIG. 2A. Such a block is generally a recognizable configuration of the pattern, e.g., the single chevron or the four-sphere configuration in FIG. 1. Since each chevron could be knitted in six rows, the instructions for such a chevron would appear only in the first six rows. In the subsequent rows, there would only be references to repeat the instructions for the initial six rows. Similarly, the instructions for the four-sphere configuration would be given only once, e.g., the first 32 rows of the instructions. For knitting these two configurations, a user in the prior art needs to keep track which row of a subsequent chevron she is knitting in relation to the four-sphere configuration. Where a sweater is a well-pattern type such as an Aran sweater, keeping track of repeats or blocks of one configuration in relation to the remaining configurations is a tedious undertaking. In addition, keeping track of the repeats in this fashion enhances the possibility of error.

In summary, a prior art knitting instruction such as the one illustrated in FIG. 2A is not only difficult to decipher but also confusing to the user. It increases the possibility of error during not only the reading of the instructions for a particular row, but also the referencing of instructions which appear in a previous row. Moreover, keeping track of repeats in the instruction is difficult, contributing to the possibility of error.

DISCLOSURE OF THE INVENTION

It is a major object of present invention to provide a collimated knitting pattern instruction panel that is capable of presenting the knitting instructions in an easy-to-read fashion.

It is another object of the present invention to provide a collimated knitting pattern instruction panel that minimizes the possibility of error.

It is a further object of the present invention to provide a collimated knitting pattern instruction panel that facilitates the tracking of repeats.

It is a still further object of the present invention to provide a collimated knitting pattern instruction panel that permits the user to readily redesign the patterns.

In order to accomplish the above and still further objects, the present invention provides a collimated knitting pattern instruction panel for instructing a user in the creation of knitwear having patterns thereon which are formed into columns. The knitwear consists of a plurality of rows of yarn each of which having at least two groups of stitching configurations, with each of the groups of stitching configurations defining a portion of a particular one of the patterns. In addition, a plurality of a particular one of the groups of stitching configurations form one of the columns on the knitwear. The collimated knitting pattern instruction panel comprises at least two detachable elongated panel members, with each of the panel members having two horizontal edges and two side-edges. At least one of the side edges of a first one of the panel members is in juxtaposition with one of the side edges of a second one of the panel members. Each of the panel members has a plurality of rows of alphanumeric characters with each of the rows being knitting pattern instructions for a particular one of the groups of stitching configurations, whereby the knitting pattern instructions for one of the columns of knitwear patterns are collimated into one of the panel members.

Other objects, features and advantages of the present invention will appear from the following detailed description of the best mode of a preferred embodiment, taken together with the accompanying drawings.

BRIEF DESCRIPTION OF THE DRAWINGS

FIG. 1 is an exemplary knitwear having a plurality of collimated patterns thereon;

FIG. 2 is a perspective view of a knitting pattern instruction in the prior art;

FIG. 2A is an enlarged, partial view of the prior art knitting pattern instruction of FIG. 2;

FIG. 3 is an enlarged, partial view of a collimated knitting pattern instruction panel of the present invention with portions broken away;

FIG. 3A is a partial view of a collimated knitting pattern instruction panel for the sweater of FIG. 1, with portions broken away;

FIG. 4 is a perspective, simplified view of the collimated knitting pattern instruction panel of FIG. 3, illustrating the interchangeability of the panel members; and FIG. 5 is a perspective, simplified view of the collimated knitting pattern instruction panel of FIG. 3, with a movable horizontal row indictor bar attached thereto.

BEST MODE FOR CARRYING OUT THE INVENTION

Referring to FIG. 1, there is shown an exemplary sweater 12 having a plurality of collimated patterns thereon. Sweater 12 illustrates seven columns 14 of patterns. In the prior art, the knitting instruction for a sweater, not shown, is given in the format illustrated in FIGS. 2 and 2A. Since a sweater is created by knitting yarn in a horizontal fashion so as to form a row of stitches, the number and type of stitches for a particular row are given. The instructions for knitting the tows are presented in a semi-coded fashion. In addition, the instructions for a row may contain multiple repetitions of a certain type of stitching. Moreover, the delineation between one type of stitching or a group of stitchings and another type of stitching or another group is not clear. For example, only commas are used to separate one type of stitching from another. The prior art instructions for Row 8, illustrated in FIG. 2A, start with one purl (p) stitch, followed by one knit (k) stitch, followed by three purl stitches which are stitched together (tog). In this fashion, a row of the sweater is constructed. Asterisks in the instruction are used to delineate a particular row sub-unit. For example, the instructions between the single asterisks in Row 8, (p1, k1, p3 tog, k1, p1, k2, p10), constitute one row sub-unit. Similarly, the instructions between the double asterisks, (p10, k2, p1, k1, p3 tog, k1, p1), constitute another row sub-unit. Instructions in the prior art also include directives for repeating portions of a prior row, e.g., the "Repeat bet [between]*'s of Row 8" phase of Row 16. Moreover, instructions include directives to repeat an entire previous row or a block of previous rows, e.g., the last instruction in Figure 2A. The prior art instructions, therefore, are difficult for the user to read, magnifying the possibility of error.

For the purpose of illustrating and describing a knitwear, each row of yarn is defined to have a plurality of groups of stitching configurations, with each group defining a portion of a particular pattern. For example, "p1" or "p3 tog" is a stitching configuration, and "p1, k1, p3 tog, k1, p1" is a group of stitching configurations. Several groups in turn form a particular column that has a particular pattern thereon. The first groups in all rows, e.g., "p1, k1, p3, tog, k1, p1"; "k1 (Y0, k1) 4 times"; etc., would form a particular pattern in the first column of a sweater, not shown. In addition, a row sub-unit may include more than one group of stitching configurations.

Referring to FIG. 3, there is shown a collimated knitting pattern instruction panel of the present invention, designated 20. Panel 20, utilizing the instructions of FIGS. 2 and 2A to illustrate the present invention, comprises a margin row indicator panel member 22 and a plurality of detachable elongated panel members 24A-24E. Since panel members 24A-24E are identical in physical configuration, only members 24A and 24B will be described. Each of panel members 24A and 24B has two horizontal edges 26A and 28A and 26B and 28B, respectively. Each of panel members 24A and 24B, includes two side edges 30A and 32A and 30B and 32B, respectively, with at least one of the side edges 30A and 32A of panel members 24A in juxtaposition with one of the side edges 30B and 32B of second panel member 24B. For example side edge 32A of first panel member 24A is in juxtaposition with side edge 30B of second panel member 24B.

Each of panel members 24A-24E has a plurality of rows 34 of alphanumeric characters. Each of rows 34 in each of panel members 24A-24 is a knitting pattern instruction for a particular one of the groups of stitching configurations such that the knitting pattern instructions for one of the columns of the sweater are collimated into one of panel members 24A-24E. For example, as shown in FIG. 3, all of the knitting pattern instructions for the first column of the sweater patterns are collimated into panel member 24A. In addition, all of the knitting instruction for a particular one of rows 34 are clearly stated. Where the knitting instructions for a particular row 34 are repeats of a portion of a prior row 34 or an entire row 34, all of the instructions are repeated. A mere reference to a prior row 34 is not permitted. For example, whereas prior instructions for Row 16 in FIG. 2A include a directive to repeat the instructions between the asterisks, the identical instructions, as shown in FIG. 3, explicitly state the stitching instructions. In addition, whereas the instructions for Row 17-32 in FIG. 2A are merely a reference to the just-completed Rows 1-16, the instructions for Rows 17-32 in FIG. 3 are explicitly stated.

Panel 20 also alleviates the fundamental problem of tracking repeats. In the prior art, the instructions for a configuration such as the chevron shown in Figure 1 would only be given once, e.g., the first six rows of the instructions. Similarly, the instructions for the four-sphere configuration of FIG. 1 would be given only once, e.g., the first 32 rows of the instructions. To knit these two configurations, a user in the prior art needs to keep track which row of a subsequent chevron he is knitting in relation to the four-sphere configuration. Where a sweater is a well-pattern type such as an Aran sweater, keeping track of repeats or blocks of one configuration in relation to the remaining configurations is a tedious undertaking. In addition, keeping track of the repeats in this fashion enhances the possibility of error.

Keeping track of the repeats in the instant invention is accomplished by using the concept of pattern units in conjunction with a new system of asterisks. An asterisk in the prevent invention is being used in a different fashion—for indicating the beginning of a set of instructions for a block of a particular pattern, referred to as a pattern unit. A pattern unit could be the number of instructions for knitting a configuration such as the chevron or the four-sphere configuration of FIG. 1. The beginning of each pattern unit starts with an asterisk. For example, the chevron pattern unit is six rows in length and the four-sphere pattern unit is 32 rows in length. For the sweater of FIG. 1, there are 48 pattern units for column A each of which being four rows in length; 30 pattern units for column B each of which being six rows in length; 5.625 pattern units for column C each of which being 32 rows in length; and 6.42 pattern units for column D each of which being 28 rows in length. For keeping track of all the pattern units in all columns of a sweater, the asterisk system of the present invention is used. For example, in FIG. 3, the user would know the beginning of all pattern units when he notices that all groups for the next row contain an asterisk, e.g., Row 17.

Keeping track of repeats in the instant invention is easy in that there are no directives to repeat portions of a previous row or a group of previous rows. All of the instruction for the row that the user is knitting are explicitly presented. Although asterisks in the present invention are used to facilitate the identification of repeats for those who are skilled in the art, elimination of the asterisks or the concept of repeats does not impede the novice or the lesser skilled from following the instructions presented by panel 20.

As best shown in FIG. 4, another feature of instruction panel 20 is the interchangeability of panel members 24A-24E. Since each of panel members 24A-24E contains all of the knitting instructions for a particular pattern in a column of a sweater, either changing that particular panel member 24 to a different location or adding or deleting another panel member 24 is permitted. For example, panel member 24B may be totally removed from instruction panel 20 such that the particular pattern it represents is removed from the sweater. In such a case, side edge 30C of panel member 24C is placed in juxtaposition with side edge 32A of panel member 24A. In addition, either panel member 24B or another panel member 24 that is identical to panel member 24B may be placed at another location of instruction panel 20, e.g., in juxtaposition with panel member 24E. In the first instance, the pattern of panel member 24B is removed from the second column and inserted at the last column. In the second instance, the pattern of panel number 24B is repeated at a column adjacent to that represented by panel member 24E. Thus, modifying the patterns on a sweater is easily accomplished.

The interchangeability aspect is especially desirable in that the patterns for a sweater are easily altered. In the prior art, redesigning the sequence of the patterns was extremely difficult. For example, each of the chevron design in column 2 of FIG. 1 could take six rows to complete and each of the four-sphere design in column 3 could take 32 rows to complete. The instructions in the prior art would be, at best, 32 rows of instructions which would include two groups of stitching configurations. The instructions for the first groups, which represent the chevron, would be six rows only. The instructions for the remaining 26 rows would include instructions to repeat the initial six rows of column 2. If one wishes to replace the pattern for column 2, difficulties are encountered since it is unlikely that the new pattern has the same number of rows as the previous pattern. The entire instructions, therefore, would need to be rewritten. Even if the number of rows is identical, the number and type of the stitching configurations for each group may not be identical such that rewriting is necessary. The rewriting of the instructions is also complicated by the fact that the instructions for each row are written in a continuous fashion without grouping the stitching configurations into some order that resembles columns. Thus, new instructions cannot be easily inserted into the space formerly occupied by the old instructions.

Utilizing panel 20 and its panel members 24 greatly enhance the redesign of knitwear patterns. Since the instructions for a column are explicitly stated for the entire length of a sweater, e.g., 180 rows, inserting or deleting a particular panel member 24, in essence, creates a new design for the sweater. There is no need to consider whether or not the new pattern has the same number of rows of instructions as the previous one. In addition, there is no need to rewrite the instructions.

The interchangeability aspect of the present invention also alleviates the problems relating to the tracking of repeats. Whereas the addition or deletion of directives in an existing instruction is troublesome, especially when repeats are used, the explicit presentation of instructions for all rows in the present invention renders the identification of repeats in the newly-added panel member 24 simple. The instructions of the newly-added panel member 24 are automatically juxtaposed in the proper relationship to the instructions of the other panel members 24.

FIG. 3A illustrates a portion of the knitting instructions for sweater 12 of FIG. 1. Since panel 120 of FIG. 3A is nearly identical to panel 20 of FIG. 3, a numeral "1" is added to the numerals designating the corresponding elements of panel 20. Panel 120 illustrates the collimation of instructions and the use of the asterisks. In addition, panel 120 illustrates simplification of the instructions. For example, since the instructions in panel member 124E are identical to those in panel member 124C, a reference is made to repeat the instructions of panel member 124C in panel member 124E. An alternative method of indicating the repetition of a prior column is to use color coding. For example, panel members 124C and 124E could be assigned a color and panel members 124B and 124F a second color.

Further, to minimize the possibility of misreading the instructions for a particular row, instruction panel 20 includes a movable horizontal row indicator bar 30, as shown in FIG. 5. Indicator bar 30 includes a slidable alignment guide 32. Alignment guide 32 is placed in juxtaposition to panel member 22. Alignment guide 32 is capable of performing a sliding motion adjacent to panel member 22. Indicator bar 30 also performs an inherent function, i.e., keeping track of the particular row 34 that the user is knitting. The user can leave his knitting at that location on instruction panel 20 and continue at a later time without losing his place.

In the preferred embodiment, as best shown in FIG. 4, panel members 24A-24E are placed between a pair of transparent, non-glare plastic covering sheets, designated 34. Covering sheets 34 are used to protect panel members 24A-24E from dust, finger smudges and the like. In addition, covering sheets 34 are used to prevent the slipping about of panel members 24A-24E. Indicator bar 30 of the preferred embodiment, as shown in FIG. 5, includes a central rectangular viewing port 36. Viewing port 36 may have magnification capabilities. Port 36 permits the user to view a particular row 34 of the knitting instructions on panel 20, thereby focussing the user's attention on that particular row 34 of instructions. Indicator bar 30 may be manufactured without a port 36. Moreover, a plurality of panels 20, each representing patterns for a portion of the sweater, may be assembled into a three-ring binder for future reference.

It will be apparent to those skilled in the art that various modifications may be made within the spirit of the invention and the scope of the appended claims. For example, row indicator bar 30 may be replaced by a magnetized metallic bar if a metal board is used as a backing for panel 20. In addition, covering sheets 34 may include a plurality of vertical pockets each of which is adapted to receive a panel member 24.

I claim:

1. A collimated knitting pattern instruction panel for instructing a user in creation of knitwear having patterns thereon which are formed into columns, wherein the knitwear consists of a plurality of rows of yarn each of which having at least two groups of stitching configurations, with each of the groups of stitching configurations defining a portion of a particular one of the patterns, and wherein further a plurality of a particular one of the groups of stitching configurations from one of the columns on the knitwear, said collimated knitting pattern instruction panel, comprising at least two separate elongated panel members, each of said panel members having two horizontal edges and two side edges, with at least one of said side edges of a first one of said panel members being in juxtaposition with one of said side edges of a second one of said panel members, wherein each of said panel members has a plurality of rows of alphanumeric characters with each of said rows being knitting pattern instructions for a particular one of the groups of stitching configurations, whereby said knitting pattern instructions for one of the columns of knitwear patterns are collimated into one of said panel members.

2. The collimated knitting pattern instruction panel as claimed in claim 1, wherein a plurality of a particular one of the groups of stitching configurations in one of the columns defines a repetitive group, and furtherwherein a plurality of the repetitive groups forms the column, wherein the repetitive group is represented by a pattern unit comprised of a plurality of rows of alphanumeric characters, with the first row of said pattern unit including a marker.

3. A collimated knitting pattern instruction panel for instructing a user in the creation of knitwear having patterns thereon which are formed into columns, wherein the knitwear consists of a plurality of rows of yarn each of which having at least two groups of stitching configurations, with each of the groups of stitching configurations defining a portion of a particular one of the patterns, furtherwherein a plurality of a particular one of the groups of stitching configurations form one of the columns on the knitwear, said collimated knitting pattern instruction panel, comprising at least two separate detachable elongated panel members, each of said panel members having two horizontal edges and two side edges, with at least one of said side edges of a first one of said panel members being in juxtaposition with one of said side edges of a second one of said panel members, wherein each of said panel members has a plurality of rows of alphanumeric characters with each of said rows being knitting pattern instructions for a particular one of the groups of stitching configurations, whereby said knitting pattern instructions for one of the columns of knitwear patterns are collimated into one of said panel members.

4. The collimated knitting pattern instruction panel as claimed in claim 3, wherein each of said panel members bearing instructions for a particular one of the groups of stitching configurations may be juxtaposed in a different sequence with respect to others of said panel members so as to permit the rapid creation of a new knitwear pattern.

5. The collimated knitting pattern instruction panel as claimed in claim 4, further comprises
a movable horizontal row indicator bar for pinpointing a particular row of alphanumeric characters to the user.

6. The collimated knitting pattern instruction panel as claimed in claim 4, wherein at least one of said panel members may be removed so as to permit the rapid creation of a new knitwear pattern.

7. The collimated knitting pattern instruction panel as claimed in claim 6, further comprises
a movable horizontal row indicator bar for pinpointing a particular row of alphanumeric characters to the user.

8. The collimated knitting pattern instruction panel as claimed in claim 4, wherein a further one of said panel members may be inserted into said panel so as to permit the rapid creation of a new knitwear pattern.

9. The collimated knitting pattern instruction panel as claimed in claim 8, further comprises
a movable horizontal row indicator bar for pinpointing a particular row of alphanumeric characters to the user.

10. The collimated knitting pattern instruction panel as claimed in claim 3, wherein at least one of said panel members may be removed so as to permit the rapid creation of a new knitwear pattern.

11. The collimated knitting pattern instruction panel as claimed in claim 10, further comprises a
movable horizontal row indicator bar for pinpointing a particular row of alphanumeric characters to the user.

12. The collimated knitting pattern instruction panel as claimed in claim 3, wherein a further one of said panel members may be inserted into said panel so as to permit the rapid creation of a new knitwear pattern.

13. The collimated knitting pattern instruction panel as claimed in claim 12, further comprises
a movable horizontal row indicator bar for pinpointing a particular row of alphanumeric characters to the user.

14. The collimated knitting pattern instruction panel as claimed in claim 3, wherein a plurality of a particular one of the groups of stitching configurations in one of the columns defines a repetitive group, and furtherwherein a plurality of the repetitive groups forms the column, wherein the repetitive group is represented by a pattern unit comprised of a plurality of rows of alphanumeric characters, with the first row of said pattern unit including a marker.

15. The collimated knitting pattern instruction panel as claimed in claim 14, further comprises
a movable horizontal row indicator bar for pinpointing a particular row of alphanumeric characters to the user.

16. A collimated knitting pattern instruction panel for instructing a user in creation of knitwear having patterns thereon which are formed into columns, wherein the knitwear consists of a plurality of rows of yarn each of which having at least two groups of stitching configurations, with each of the groups of stitching configurations defining a portion of a particular one of the patterns, and wherein further a plurality of a particular one of the groups of stitching configurations defines a repetitive group such that a plurality of the repetitive groups forms one of the columns of the knitwear, said collimated knitting pattern instruction panel, comprising at least two separate detachable elongated panel members, each of said panel members having two horizontal edges and two side edges, with at least one of said side edges of a first one of said panel members being in juxtaposition with one of said side edges of a second one of said panel members, wherein each of said panel members has a plurality of rows of alphanumeric characters with each of said rows being knitting pattern instructions for a particular one of the groups of stitching configurations, and furtherwherein the repetitive group is represented by a pattern unit comprised of a plurality of rows of alphanumeric characters, with the first row of said pattern unit including a marker, whereby said knitting pattern instructions for one of the columns of knitwear patterns are collimated into one of said panel members.

17. The collimated knitting pattern instruction panel as claimed in claim 16, wherein each of said panel members bearing instructions for a particular one of the groups of stitching configurations may be juxtaposed in a different sequence with respect to others of said panel members so as to permit the rapid creation of a new knitwear pattern.

18. The collimated knitting pattern instruction panel as claimed in claim 17, further comprises a movable horizontal row indicator bar for pinpointing a particular row of alphanumeric characters to the user.

19. The collimated knitting pattern instruction panel as claimed in claim 16, wherein at least one of said panel members may be removed so as to permit the rapid creation of a new knitwear pattern.

20. The collimated knitting pattern instruction panel as claimed in claim 19, further comprises a movable horizontal row indicator bar for pinpointing a particular row of alphanumeric characters to the user.

21. The collimated knitting pattern instruction panel as claimed in claim 16, wherein a further one of said panel members may be inserted into said panel so a to permit the rapid creation of a new knitwear pattern.

22. The collimated knitting pattern instruction panel as claimed in claim 21, further comprises a moveable horizontal row indicator bar for pinpointing a particular row of alphanumeric characters to the user.

* * * * *